Sept. 18, 1945.            H. J. GALLAGHER            2,384,908
                              NUT LOCK
                          Filed April 7, 1943
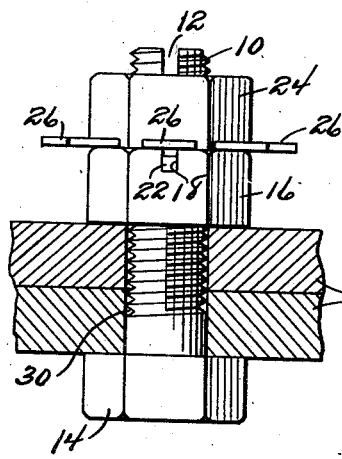
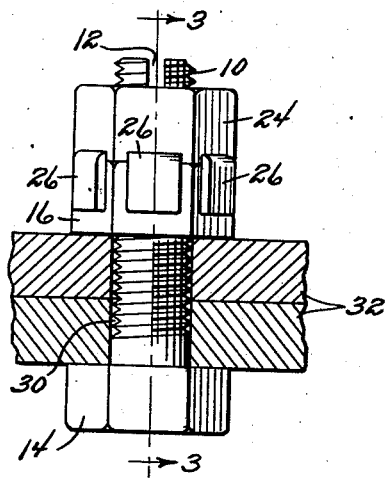
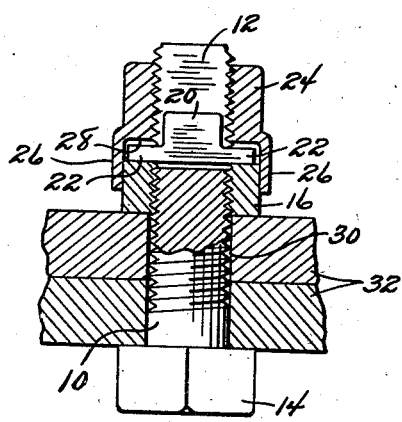
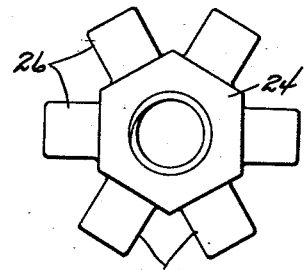
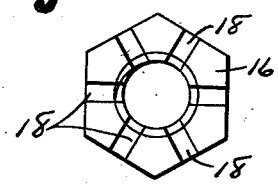
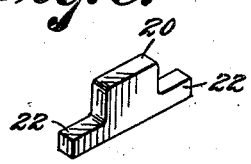
Hugh J. Gallagher INVENTOR.
BY
Victor J. Evans & Co.
ATTORNEYS Patented Sept. 18, 1945

2,384,908

UNITED STATES PATENT OFFICE 2,384,908

NUT LOCK

Hugh J. Gallagher, Gallitzin, Pa., assignor to Matilda McMullen, Buffalo, N. Y.

Application April 7, 1943, Serial No. 482,167

1 Claim. (Cl. 151—5)

My invention relates to fastening devices, and has among its objects and advantages the provision of an improved lock nut.

In the accompanying drawing:

Figure 1 is a view illustrating the bolt and the nuts tightened;

Figure 2 is a similar view illustrating the nuts connected against relative rotary movement;

Figure 3 is a sectional view substantially along the line 3—3 of Figure 2;

Figure 4 is a plan view of one of the nuts;

Figure 5 is a plan view of a companion nut; and

Figure 6 is a perspective view of a nut key.

In the embodiment selected for illustration, I make use of a bolt 10 having an axial slot 12 in its end opposite the head 14. A first nut 16 is threadedly connected with the bolt 10 and is provided with a plurality of radial grooves 18. A key 20 is receivable in the slot 12 and is provided with two fingers 22 receivable in two diametrically opposed grooves 18 in the nut 16.

A second nut 24 is threaded on the bolt 10 and is provided with a plurality of ears 26 normally lying in a plane flush with the face 28 of the nut 24 and bendable into position for engaging side faces of the nut 16.

In operation, the bolt is slipped through the aligned openings 3 formed in the parts 32 to be connected. The nut 16 is then tightened to clamp the parts 32 together and to bring two diametrically opposed grooves 18 into registration with the slot 12. The key 20 is then slid into the slot 12 of the bolt and its fingers 22 engaged in grooves 18 of the nut 16, the nut 24 being then applied and screwed tightly into place against the nut 16, after which the ears 26 are bent to the position of Figure 3 for engaging the side faces of the nut 16.

It will thus be seen that the nut 16 is keyed against relative rotation with respect to the bolt 10 and that the ears 26 make the nut 24 secure against relative rotation both with respect to the nut 16 and the bolt 10.

Without further elaboration, the foregoing will so fully illustrate my invention, that others may, by applying current knowledge, readily adapt the same for use under various conditions of service.

I claim:

In a nut lock, the combination of a threaded bolt having a longitudinally extending slot formed diametrically thereof, a first nut provided with radial grooves in the outer end thereof, said nut being internally threaded for connection with the bolt, a key receivable in the slot in the bolt, said key being of less width than the slot and having fingers extending from opposite sides of its inner end for engaging in the grooves, a second nut threadedly connected with said bolt for engagement with the first nut, and tongues extending laterally from the inner end of said second nut and bendable into engagement with side faces of said first nut to restrain the second nut from relative rotation.

HUGH J. GALLAGHER.